US007609150B2

(12) United States Patent
Wheatley et al.

(10) Patent No.: US 7,609,150 B2
(45) Date of Patent: Oct. 27, 2009

(54) USER ADAPTIVE VEHICLE HAZARD WARNING APPARATUSES AND METHOD

(75) Inventors: David J Wheatley, Tower Lakes, IL (US); Joshua B Hurwitz, Niles, IL (US)

(73) Assignee: Motorola, Inc., Schaumburg, IL (US)

( * ) Notice: Subject to any disclaimer, the term of this patent is extended or adjusted under 35 U.S.C. 154(b) by 228 days.

(21) Appl. No.: 11/465,549

(22) Filed: Aug. 18, 2006

(65) Prior Publication Data

US 2008/0042813 A1  Feb. 21, 2008

(51) Int. Cl.
*B60Q 1/00* (2006.01)
(52) U.S. Cl. .................. 340/436; 340/438; 340/439
(58) Field of Classification Search .............. 340/436, 340/438, 439
See application file for complete search history.

(56) References Cited

U.S. PATENT DOCUMENTS

| 5,075,881 | A |   | 12/1991 | Blomberg |         |
|-----------|---|---|---------|----------|---------|
| 5,465,079 | A |   | 11/1995 | Bouchard |         |
| 6,023,227 | A |   | 2/2000  | Yanko    |         |
| 6,091,323 | A |   | 7/2000  | Kawai    |         |
| 6,097,311 | A |   | 8/2000  | Iwasaki  |         |
| 6,114,951 | A |   | 9/2000  | Kinoshita |        |
| 6,119,068 | A |   | 9/2000  | Kannonji |         |
| 6,150,932 | A | * | 11/2000 | Kenue    | 340/435 |
| 6,184,791 | B1 |  | 2/2001  | Baugh    |         |
| 6,202,020 | B1 |  | 3/2001  | Kyrtsos  |         |
| 6,241,686 | B1 |  | 6/2001  | Balkin   |         |
| 6,392,550 | B1 |  | 5/2002  | Najor    |         |
| 6,529,831 | B1 |  | 3/2003  | Smith    |         |
| 6,679,702 | B1 |  | 1/2004  | Rau      |         |
| 6,753,766 | B2 |  | 6/2004  | Patchell |         |
| 6,831,572 | B2 |  | 12/2004 | Strumolo |         |
| 6,894,608 | B1 |  | 5/2005  | Gunderson |        |
| 6,906,619 | B2 |  | 6/2005  | Williams |         |
| 7,124,027 | B1 | * | 10/2006 | Ernst et al. | 701/301 |
| 7,266,438 | B2 |  | 9/2007  | Kellum   |         |
| 7,292,152 | B2 |  | 11/2007 | Torkkola |         |
| 7,349,767 | B2 | * | 3/2008  | Kuge et al. | 701/1 |
| 2002/0173881 | A1 | * | 11/2002 | Lash et al. | 701/1 |
| 2003/0236605 | A1 | * | 12/2003 | Takahashi | 701/45 |
| 2004/0088095 | A1 | * | 5/2004  | Eberle et al. | 701/45 |
| 2004/0102901 | A1 | * | 5/2004  | Altan et al. | 701/301 |
| 2004/0167702 | A1 |   | 8/2004  | Isogai   |         |

(Continued)

OTHER PUBLICATIONS

Parag H. Batavia, "Driver-Adaptive Lane Departure Warning Systems", Sep. 20, 1999, CMU-RI-TR-99-25, The Robotics Institute, Carnegie Mellon University, Pittsburgh, PA.

(Continued)

*Primary Examiner*—Toan N Pham
*Assistant Examiner*—Kerri L McNally
(74) *Attorney, Agent, or Firm*—Terri S. Hughes

(57) ABSTRACT

Apparatuses and methods for providing improved in-vehicle warnings are disclosed. A driver's prior driving performance and a summary representation of that performance may be used as parameters in a hazard or collision warning algorithm. Information from sensors regarding the vehicle, driver, and external traffic and roadway conditions may be used to estimate driver performance variables in particular driving situations. Each driver performance estimate may be included into one or more overall summary variables for that driving situation. The value of these summary variables may then be used in an algorithm to control the nature and timing of a warning, when a similar situation arises again in the future.

9 Claims, 4 Drawing Sheets

U.S. PATENT DOCUMENTS

2005/0080565 A1    4/2005  Olney
2006/0178830 A1*   8/2006  Sherony .................... 701/301

OTHER PUBLICATIONS

Reiner Onken, "Daisy, An Adaptive, Knowledge-Based Driver Monitoring and Warning System", Neubiberg, Germany.

US Office Action for Related U.S. Appl. No. 11/465,559 Dated Aug. 4, 2008.

US Amendment for Related U.S. Appl. No. 11/465,559 Dated Dec. 31, 2008.

US Office Action for Related U.S. Appl. No. 11/465,559 Dated Feb. 4, 2009.

* cited by examiner

USER ADAPTIVE VEHICLE HAZARD WARNING APPARATUSES AND METHOD

CROSS-REFERENCE TO RELATED APPLICATION

The present application is related to commonly-owned U.S. application Ser. No. 11/465,559, filed Aug. 18, 2006, entitled "Mode-Sensitive Vehicle Hazard Warning Apparatuses and Methods," filed on even date herewith. The contents of said application are hereby incorporated by reference.

FIELD OF THE INVENTION

The present disclosure relates generally to the field of vehicle operation, and more particularly, to systems and methods for improved vehicle hazard warnings.

BACKGROUND

Various in-vehicle warning systems can alert a driver of a vehicle to potential hazards in the driving environment. For example, a collision-avoidance system can detect a potential hazard and warn a driver when a collision appears possible or likely. Such warnings may include, for example, forward-collision warnings, side-collision warnings, rear-end collision warnings, headway warnings, blind-spot warnings, lane-departure warnings, and others. Other driver-assistance systems can assist the driver in operating the vehicle safely by providing warnings about roadway conditions, traffic, visibility, and other adverse conditions.

Various prior-art warning systems use parameters such as the time required for drivers to recognize potential road hazards and to complete collision avoidance responses. The parameters, however, are typically estimates based on the "typical" performance of a population of drivers, and do not account for individual differences among drivers. In addition, prior warning systems do not account for variations in driving behavior in different driving contexts. For example, prior systems typically assume that driver response times for avoiding a given hazard will be the same, regardless of the driving context. This can result in providing a warning that is too early or too late to be effective. Furthermore, prior warning systems do not provide for customization of the modality of the warning. For example, one driver may be quicker to respond to an auditory warning, while another driver may be quicker to respond to a haptic warning, and the prior warning systems typically do not take such individual differences into account.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION OF THE INVENTION

Figure 1:
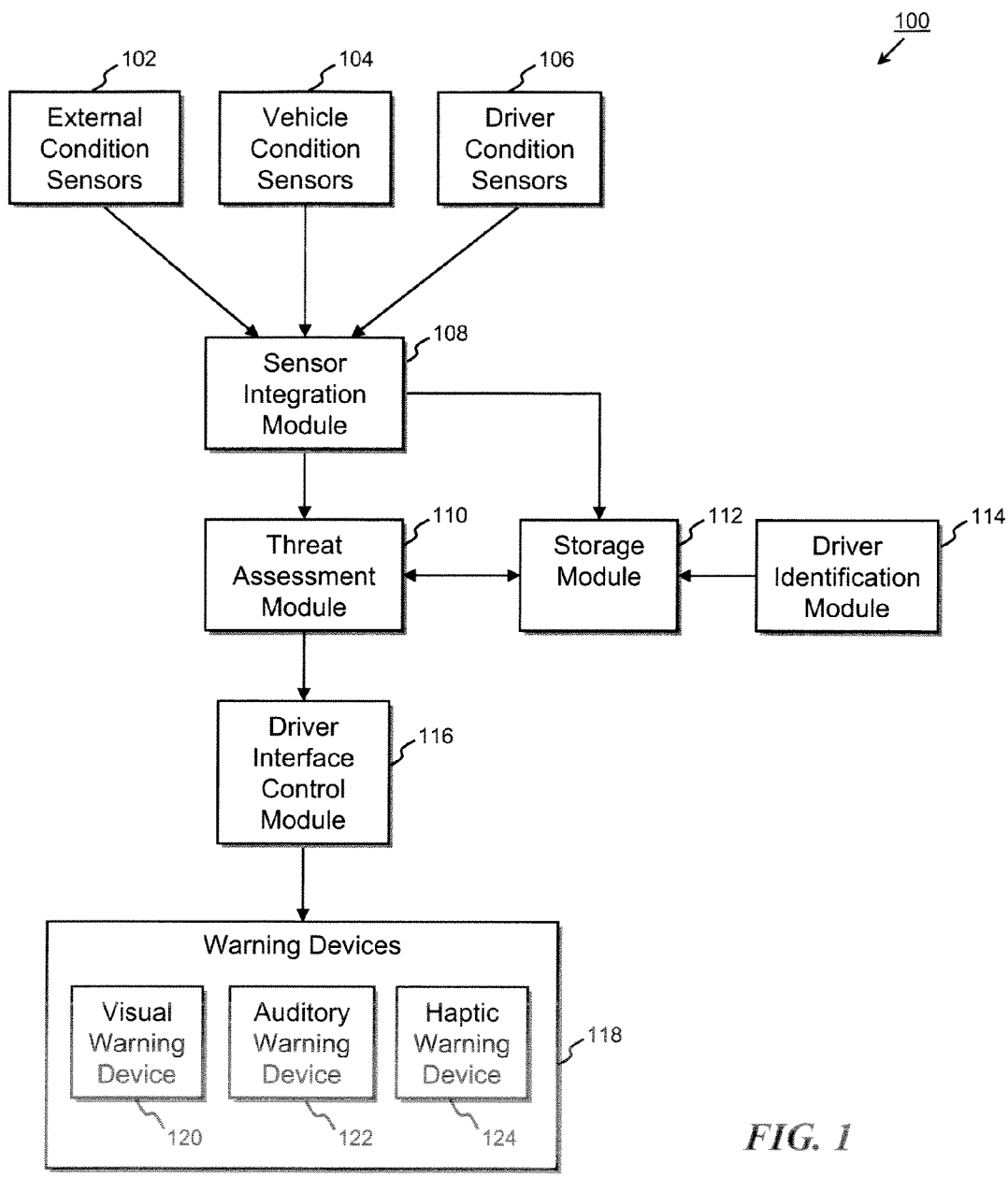
FIG. 1 depicts an exemplary block diagram of an apparatus for providing user-adaptive warnings in accordance with one embodiment of the present invention.

Various embodiments of the present invention overcome the problem of lack of personalization by tracking a driver's prior driving performance and using a summary representation of that performance as a parameter in a warning algorithm. Sensor information about the vehicle, driver, and external traffic and roadway conditions may be used to estimate driver performance variables in particular driving situations, such as the time taken by a driver to recognize and respond to a sudden lead-vehicle deceleration in a vehicle-following situation. Each driver performance estimate may be included into an overall summary variable for that driving situation (e.g., an average or median response time, or a prediction from a statistical model of the response time). The value of this summary variable may then be used in an algorithm to control the nature and timing of a warning, when this or a comparable situation arises again in the future (e.g., the time to present a forward collision warning).

In accordance with various embodiments of the present invention, methods for providing improved in-vehicle warnings based on individual driver performance are disclosed. In one embodiment, a method of controlling presentation of vehicle hazard warnings to a driver of a vehicle is provided. The method includes detecting a driving situation based upon information from one or more sensors and detecting a potential driving hazard. The method also includes determining a predicted driver performance parameter based upon information regarding the driver's past performance in one or more similar driving situations. The method further includes determining an estimated driver performance parameter in order to avoid the hazard, and comparing the predicted driver performance parameter to the estimated driver performance parameter. A determination of whether to provide a warning to the driver is made, based upon the comparison, and if the comparison indicates that the warning should be provided, one or more modalities of presentation of the warning are determined, based upon the driver.

In another embodiment, a method of providing a hazard/collision warning to a driver of a vehicle is provided. The method includes detecting a driving situation based upon information from one or more sensors and detecting a potential hazard/collision. The method also includes determining a predicted time available for the driver to avoid the hazard/collision. The method further includes determining an estimated response time for the driver to respond to the potential hazard/collision, based upon information regarding the driver's past performance in one or more similar driving situations. The method also includes providing a hazard/collision warning to the driver, if the time available for the driver to avoid the hazard/collision is less than or equal to the estimated response time plus a safety margin, wherein the safety margin is greater than or equal to zero.

In accordance with other various embodiments of the present invention, an apparatus for providing improved warnings to a driver of a vehicle is disclosed. In one embodiment, the apparatus includes a sensor integration module operable to identify a driving situation based upon information from one or more sensors. The apparatus also includes a threat assessment module operable to determine an estimated driver performance parameter in order for the driver to avoid a potential driving hazard. The apparatus further includes a storage module operable to store information regarding the user's performance in prior driving situations. The apparatus also includes a user interface control module operable to determine whether to provide a warning to the user based upon the information regarding the user's performance in prior driving situations. The apparatus further includes one or more warning devices communicably coupled to the user interface control module. The warning devices may include visual warning devices, auditory warning devices, haptic warning devices, as well as other warning devices.

In addition, various embodiments of the present invention overcome the lack of sensitivity to driving contexts by taking driving modes into account to provide more effective warnings. In accordance with further embodiments of the present invention, methods for providing improved in-vehicle warnings based on driving modes are provided. In one embodiment, the method includes detecting a driving situation based upon information from one or more sensors, detecting a potential driving hazard, and determining a driving mode. The method also includes predicting a driver response in order to avoid the potential driving hazard and determining whether to provide a warning to the driver, based upon the driving mode and based on the predicted driver response. If the warning is determined to be provided, one or more modalities of presentation of the warning are determined.

In another embodiment, the method comprises detecting a driving situation based on information from one or more sensors, detecting a potential driving hazard, and determining a driving mode. The method also includes determining whether to provide a warning to the user, based upon information regarding the user's performance in one or more previous driving situations, and based upon the driving mode. If a warning is determined to be provided to the user, the warning may be customized based on the information regarding the user's performance in one or more previous driving situations, and based upon the driving mode.

In accordance with other various embodiments of the present invention, a method of providing a hazard/collision warning to a driver of a vehicle is provided. The method includes detecting a driving situation based upon information from one or more sensors, detecting a potential hazard/collision, and detecting a mode of driving. The method also includes determining a predicted time available for the driver to avoid the hazard/collision, and determining an estimated response time for the driver to respond to the potential hazard/collision, based upon the mode of driving. The method further includes providing the hazard/collision warning to the driver, if the time available for the driver to avoid the hazard/collision is less than or equal to the estimated response time plus a safety margin, wherein the safety margin is greater than or equal to zero.

In another embodiment, an apparatus for providing a warning to a driver when operating a vehicle is provided. The apparatus includes a sensor integration module operable to identify a driving situation based upon information received from one or more sensors, a threat assessment module operable to determine an estimated driver performance parameter in order for the driver to avoid a potential driving hazard, a driver mode detection module operable to determine a mode of driving, a driver interface control module operable to determine whether to provide a warning to the driver based upon the mode of driving, and one or more warning devices communicably coupled to the driver interface control module.

Reference is now made to FIG. 1 which depicts a block diagram of an in-vehicle warning apparatus 100 in accordance with one embodiment of the present invention. The apparatus 100 may comprise a number of sensors. Any of a wide variety of types of sensors may be used. For example, radar detectors, optical sensors, laser distance sensors, smart video, accelerometers, and other sensors, whether now known or after-arising, may be used to detect various conditions relating to the vehicle, the environment, and the driver. As used herein, vehicle includes motor vehicles, including without limitation automobiles, utility vehicles, recreational vehicles, multipurpose vehicles, trucks, trailers, semi-trucks, ambulances, fire trucks, tow trucks, buses, minibuses, vans, minivans, and other vehicles. Vehicle also includes passenger vehicles and commercial vehicles.

The apparatus 100 may comprise one or more external condition sensors 102 which can detect various conditions external to the vehicle. The external conditions being detected may include, for example, distance to other vehicles, closing speed with other vehicles, traffic conditions, road signs and traffic lights, road conditions (such as, for example, external temperature, precipitation, etc.), visibility conditions (such as fog, lightness/darkness, etc.), and/or the distance of the vehicle from the edge of the lane. The examples of external conditions described above are not intended to be limiting, and it will obvious to a person of skill in the art that various other external conditions may be detected by the external condition sensors 102.

The apparatus 100 may also comprise one or more vehicle condition sensors 104 which can detect various conditions regarding the state of the vehicle. The vehicle conditions being detected may include, for example, forward velocity, lateral velocity, momentary acceleration, and/or braking capabilities. The examples of vehicle conditions described above are not intended to be limiting, and it will obvious to a person of skill in the art that various other vehicle conditions may be detected by the vehicle condition sensors 104.

The apparatus 100 may also comprise one or more driver condition sensors 106 which can detect various conditions regarding the driver state. The driver conditions being detected may include, for example, eye-gaze direction. Various methods for detecting eye-gaze direction can be found in U.S. Pat. No. 6,906,619 entitled "Visual Attention Influenced Condition Indicia Apparatus and Method," the contents of which are hereby incorporated by reference. The driver conditions being detected may also include eye blink rate, foot location (e.g. whether the driver's foot is on the accelerator, brake pedal, or neither), and/or whether the driver's hands are on the steering wheel. The examples of driver conditions described above are not intended to be limiting, and it will obvious to a person of skill in the art that various other driver conditions may be detected by the driver condition sensors 106.

Data from the sensors 102, 104, and 106 may be sent to a sensor integration module 108. The sensor integration module 108 can identify and categorize the driving situation accordingly. Data from the sensor integration module 108 feeds into a threat assessment module 110. The threat assessment module 110 estimates the time to a hazard and the time available for the driver to avoid the hazard. A hazard may include a potential accident, collision, unsafe condition, or other condition that is desired to be avoided.

In accordance with the present embodiment, a storage module 112 stores data about a driver's performance in driving situations. For example, the storage module 112 may store data regarding response times and response patterns for event/status combination. The driver performance data helps to achieve an optimal presentation of customized warnings to a specific driver. The driver performance data may be updated over time. In some embodiments, the data in the storage module 112 may be initialized to default values that are typical for most drivers. In some embodiments, the driver may enter some personal information (e.g., gender, age, geographic location, etc.) that may be used to initialize the system with parameters that are typical for drivers who are similar to the target driver.

A driver identification module 114 feeds into the storage module 112 and identifies a specific driver. The identification may be accomplished in any of a number of ways. As a non-limiting example, the driver may be identified by a fingerprint sensor or other biometric sensor. As another non-limiting example, the driver may be identified by a key fob associated with that driver. As another non-limiting example, the driver may be identified by a private code that the driver enters into the system through a user interface in the vehicle or through a handheld device that wirelessly communicates with the system. At least some of the driver information may be stored in the key fob and synchronized with information stored in the storage module 112, in some embodiments.

A driver interface control module 116 determines whether to present a warning. If a warning is determined to be presented, the driver interface control module 116 sends control data and warning data to one or more warning devices 118. The driver interface control module 116 may determine the timing of the presentation of a warning. For example, the driver interface control module 116 may determine when to present a warning. The driver interface control module 116 may also determine the intensity of a warning. For example, the driver interface control module 116 may determine the rate of escalation of the intensity of the warning.

The driver interface control module 116 may further determine one or more modalities regarding how to present the warning. For example, the warning may be presented visually via a visual warning device 120, such as a situation awareness display. As another example, the warning may be presented audibly via an auditory warning device 122. For example, a verbal warning, beep, or other sound may be used to provide a warning to the driver. As another example, the warning may be presented via a haptic warning device 124. For example, a vibrating steering wheel, seat belt, or seat may be used to provide a warning to the driver. In addition, multiple modalities may be used to present a warning to the driver. The determination of modalities may be based upon the driver's data in the storage module 112. For example, the determination may be based upon which modality or combination of modalities is most likely to produce the most rapid response from the driver. As another example, the determination may be influenced by one or more driver preferences stored in the storage module 112.

The above-referenced modules and components may comprise hardware, software, firmware, or a combination thereof. In some cases, data may be transmitted among the modules wirelessly. For example, data may be wirelessly transmitted according to the Bluetooth specification, Wi-Fi specification, or other wireless communication protocol. In some cases, data may be transmitted among the modules and components via a vehicle data bus. Examples of a suitable data bus include, without limitation, a controller area network (CAN) bus and a media oriented systems transport (MOST) bus. The modules and components may also be coupled to a central processor unit via the bus.

Figure 2:
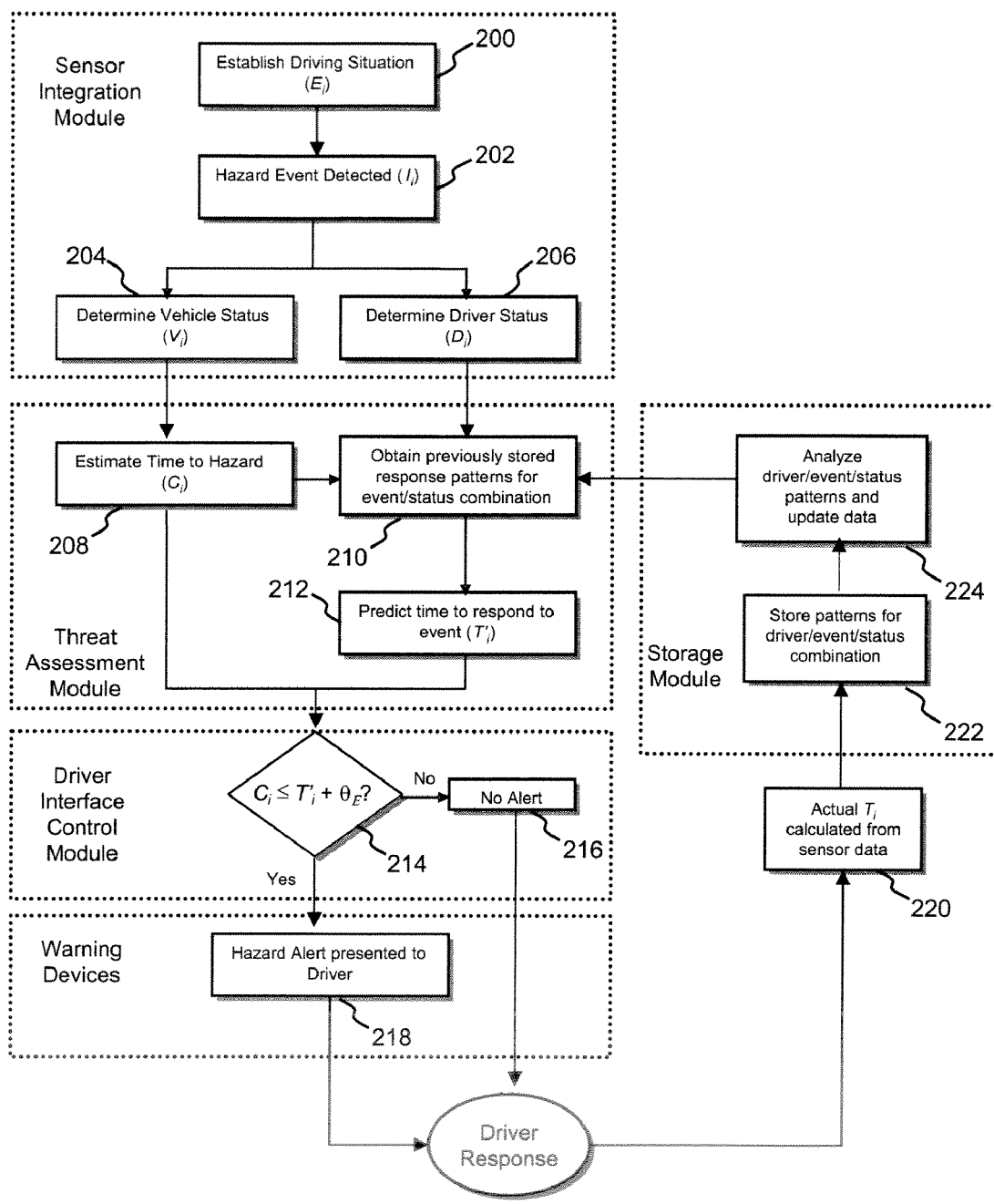
FIG. 2 depicts an exemplary process flow diagram for providing user-adaptive warnings in accordance with one embodiment of the present invention.

Reference is now made to FIG. 2, which depicts a process flow diagram for providing a driver-adaptive warning in conjunction with the apparatus 100 of FIG. 1. In step 200, a driving situation $E_i$ is established by the sensor integration module 108. Illustrative examples of a driving situation include, without limitation, following another vehicle, negotiating a curve in the road, overtaking another vehicle, changing lanes, or other situations. In each case, the sensor integration module may compute relevant parameters for that driving situation, such as the distance to the lead vehicle in the vehicle-following situation or the radius of curvature in the road in the curve-negotiating situation.

In step 202, a hazard event $I_i$ is detected. For example, in the case of following another vehicle, the hazard event may comprise deceleration of the lead vehicle. As another example, the hazard event may comprise another vehicle's veering toward the edge of a lane. Additional types of hazard events may be determined, utilizing information from the external condition sensors 102 and/or sensor integration module 108.

In step 204, a vehicle status $V_i$ is determined. For example, the velocity of the driver's vehicle, the angle of the steering wheel, and the condition of the vehicle's brakes may be determined. Additional vehicle statuses may be determined, utilizing information from the vehicle condition sensors 104 and/or sensor integration module 108.

In step 206, a driver status $D_i$ is determined. For example, the driver's eye-gaze direction, foot position and position of hands on or off the steering wheel may be determined. The driver's use of a wireless communication device may also be determined. Additional driver statuses may be determined, utilizing information from the driver condition sensors 106 and/or sensor integration module 108.

The threat assessment module 110 estimates, for driving situation $E_i$, the time to the hazard event $C_i$ in step 208. The previously stored driver response times and patterns for prior situations that are comparable to $E_i$ are obtained from the storage module 112 in step 210. A predicted time to respond to the event $T_i'$ is determined in step 212 based on, inter alia, the above statuses and the specific driver's past performance.

As a non-limiting example, the predicted response time in the context of a headway warning may be given as $T_i' = \alpha + \beta R_i + \gamma D_{iL}$, where $\alpha$, $\beta$, $\gamma$ are regression parameters, i represents the hazard event, and L represents the lead vehicle. $R_i$ represents the minimum response time that the driver had exhibited when no warning occurred on all recorded prior events that were similar to event i, and $D_{iL}$ represents the initial headway for this event.

The driver interface control module 116 compares the time to hazard $C_i$ to the predicted response time $T_i'$ in decision 214. If $C_i > T_i' + \theta_E$, no hazard alert is presented in step 216. If $C_i \leq T_i' + \theta_E$, then a hazard alert is presented to the driver in step 218 via one or more of the warning devices 118. it should be noted that the parameter $\theta_E$ is a value greater than or equal to 0, and represents a safety margin for providing warnings in all driving situations that belong in category E. In the current example, E represents vehicle-following situations. The timing and modality of the warnings may be selected based on what is determined to be most effective for the particular driver. A person who is historically slow to respond may be given an earlier warning, while a person who is quicker to respond may be given a later warning. This reduces the problem of nuisance alarms (which occur after the driver has perceived the hazard and may have already initiated an avoidance response). Since frequent nuisance alarms could cause drivers to ignore them, the likelihood that the driver will give attention to the warnings as presented in the present invention is increased.

The driver's actual response time, $T_i$, is determined in step 220. For example, in the case of vehicle following, the actual response time may comprise the time in which the driver's gaze reorients to the lead vehicle, the driver perceives the potential hazard, removes his or her foot from the accelerator pedal, and places his or her foot on the brake pedal and applies maximum pressure. The driver's actual response time, $T_i$, is stored in the storage module 112 in step 222. Patterns of driver, event, and status may be analyzed and the driver's overall performance summary may be updated accordingly in step 224. Statistical modeling techniques may be used to adapt a warning algorithm according to the individual person. For example, in the case of vehicle following, the actual time $t_i$ can be used to update the estimate of the time $T_i'$ for the driver to complete a response as follows: If $t_i < R_i$, then $R_{i+1} = t_i$, otherwise, $R_{i+1} = R_i$, so that $T_{i+1}' = \alpha + \beta R_{i+1} + \gamma D_{i+1,L+1}$ Thus, for a given driving event, a summary of measurements from previous similar events may be used to estimate driver-related parameters for the event. For example, the time for a driver to initiate a hazard avoidance response during the event (e.g., for a given hazard and level of hazard, the time to perceive the hazard and remove the foot from the accelerator pedal) may be estimated. This estimate may then be used in a hazard/collision avoidance algorithm to control the user interface for an in-vehicle warning to the driver. The method may, for example, affect the timing, modality, and intensity of the warning. It may also integrate into the pre-existing estimate of driver performance the new performance measurement taken during the event, thereby improving the accuracy and stability of estimates.

In order to estimate the driver's response time in a vehicle-following situation, the method may begin with an estimate based on a statistical summary of measurements, such as the average response time, from previous vehicle-following situations. The estimate may be derived from various sensor measurements taken in previous situations that relate to the driver's attention and use of vehicle controls, including, for example, eye gaze, accelerator, and brake pedal sensors. The estimate may comprise the average time taken from the moment the lead vehicle initiates its deceleration until the driver initiates an avoidance response by removing his or her foot from the accelerator pedal.

If the driver reorients his eye gaze toward the lead vehicle, and then removes his foot from the accelerator pedal, the method may calculate the time required to complete this response sequence based on the sensor measurements. This time to respond may then be used to update the estimated time for the driver to respond to future such potential driving hazards. However, if the driver does not initiate this response sequence within a certain amount of time, then the method may present a warning to the driver.

As another example, a hazard event may comprise a second vehicle's veering toward the edge of a lane. The various sensors may determine various statuses such as whether the driver's foot is on the throttle or brake, the speed and acceleration of the vehicle, the driver's eye gaze direction, and the steering position, etc. Previously stored response patterns for the similar events and statuses may be obtained. An estimated time to initiate steering correction and brake actuation, and the degree of steering correction may be determined.

In addition to driver response time, other driver performance characteristics or metrics may be utilized in order to determine whether to present a warning, and how and when to present the warning. For example, in a case of negotiating a curve in the road, characteristics or metrics such as speed and acceleration may be used. As another example, in a case of overtaking a vehicle, characteristics or metrics such as steering and acceleration may be used. As a further example, in a case of initiating an overtaking maneuver, the time it takes for the driver to gaze at the outside rearview mirror may be used. These examples are provided for illustrative purposes, and it should be understood that other driver performance characteristics may be appropriate.

Figure 3:
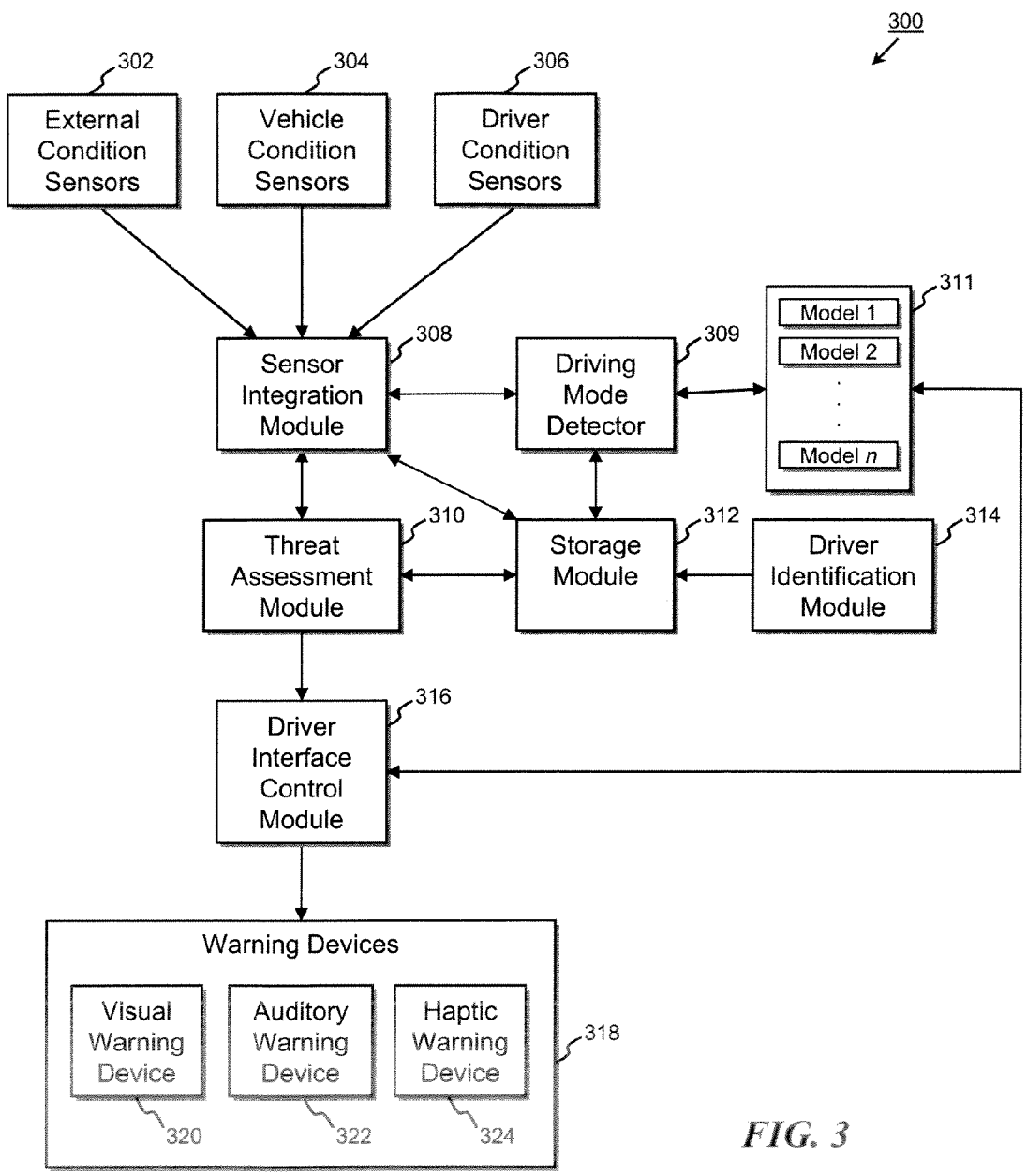
FIG. 3 depicts an exemplary block diagram of an apparatus for providing user-adaptive and mode-sensitive warnings in accordance with another embodiment of the present invention.

Reference is now made to FIG. 3, which depicts a block diagram of an in-vehicle warning apparatus 300 in accordance with another embodiment of the present invention. The apparatus 300 provides for different warnings according to the mode of driving.

The apparatus 300 may comprise a number of sensors. Any of a wide variety of types of sensors may be used. For example, radar detectors, optical sensors, laser distance sensors, smart video, accelerometers, and other sensors, whether now known or after-arising, may be used to detect various conditions relating to the vehicle, the environment, and the driver.

The apparatus 300 may comprise one or more external condition sensors 302 which can detect various conditions external to the vehicle. The external conditions being detected may include, for example, distance to other vehicles, closing speed with other vehicles, traffic conditions (such as traffic density), the distance of the vehicle from the edge of the lane, road signs and traffic lights, road conditions (such as, for example, external temperature, precipitation, etc), road type (such as, for example, highway, artery, or neighborhood road, etc.), location type (such as, for example, urban, suburban, or rural, etc.), visibility conditions (such as fog, lightness/darkness, etc.), and/or time of day (such as whether it is day or night). The examples of external conditions described above are not intended to be limiting, and it will obvious to a person of skill in the art that various other external conditions may be detected by the external condition sensors 302.

The apparatus 300 may also comprise one or more vehicle condition sensors 304 which can detect various conditions regarding the state of the vehicle. The vehicle conditions being detected may also include, for example, forward velocity, lateral velocity, momentary acceleration, brake pressure, activation of a siren or other emergency indicator, trailer weight, and/or absence or presence of one or more passengers. The examples of vehicle conditions described above are not intended to be limiting, and it will obvious to a person of skill in the art that various other vehicle conditions may be detected by the vehicle condition sensors 304.

The apparatus 300 may also comprise one or more driver condition sensors 306 which can detect various conditions regarding the driver state. The driver conditions being detected may include, for example, eye-gaze direction, eye blink rate, foot location (e.g., whether the driver's foot is on the accelerator, brake pedal, or neither), and/or whether the driver's hands are on the steering wheel. The examples of driver conditions described above are not intended to be limiting, and it will obvious to a person of skill in the art that various other driver conditions may be detected by the driver condition sensors 306.

Data from the sensors 302, 304, and 306 may be sent to a sensor integration module 308. The sensor integration module 308 can identify and categorize the driving situation accordingly.

In accordance with the present embodiment, data from the sensor integration module 308 feeds into a driving mode detector 309. The driving mode detector 309 determines a mode of driving based on the context of driving as determined from the information obtained from the sensor integration module 308. Alternatively, in some embodiments, the sensor integration module 308 may determine the mode of driving.

A mode of driving generally includes any style of driving that is motivated by a particular context and is characterized by a pattern of driving behavior that is distinguishable from another pattern of driving behavior. The context may be characterized by features of the driving environment or vehicle status that are measured by in-vehicle sensors. For example, the context may impose psychological pressures on the driver. As another example, the context may include a goal that the driver wants to achieve. In these modes, there may be a consistent pattern of driving behaviors recorded by the in-vehicle sensors that is indicative of the pressures on and/or goals of the driver—such as maintaining higher speeds, closer following distances, and shorter stopping times at stop signs, etc. Furthermore, these patterns may be different from patterns that the sensors detect in other modes of driving.

Information identifying the mode of driving is provided to a module 311 comprising a plurality of n models for adapting the timing and nature of warnings according to the mode. Alternatively, the information regarding the models may be stored in a storage module 312. Values for the parameters of a warning algorithm such as a hazard warning algorithm may be adapted according to the mode. In some embodiments, information regarding one or more modes may be initially pre-stored in module 311 or in storage module 312. In some embodiments, new modes may be discovered as described in more detail below.

As a non-limiting example, a driver of a vehicle may drive in any of a number of different modes including, for example, an urban mode, a suburban mode, and a rural mode. The mode may be determined based on, for example, global positioning system (GPS) location information. As an example, a driver may accelerate and decelerate more rapidly and follow other vehicles more closely in urban areas as compared to rural areas.

As another non-limiting example, a driver of an emergency vehicle such as an ambulance may drive in any of a number of different modes. The modes may include without limitation a normal cruising mode, an emergency mode (for example, when en route to an emergency), and a passenger mode when the ambulance is carrying one or more patients. The mode may be detected based on, for example, activation of a siren or light or other emergency indicator. As another example, the mode may be detected based on communications with a public safety dispatcher. In emergency mode, a driver may exhibit a pattern of driving which may include, for example, driving at higher speeds, changing lanes more quickly, driving through red lights, and driving at a higher velocity through curves in the road, etc. In passenger mode, the driver may still drive at a relatively high speed, but may be more careful with respect to braking deceleration, negotiating curves in the road, and making lane changes, in order to avoid jostling a patient in the vehicle. In normal mode, the driver may be more likely to conform to speed limits, respond appropriately to traffic signs and signals, and wait in line with other traffic. Furthermore, in an emergency response situation, some drivers may be more alert to potential hazards when driving in heavy traffic than when the traffic is relatively light. Thus, these drivers would likely identify unexpected hazards more rapidly and respond more quickly to them when driving in heavy traffic.

As another non-limiting example, a driver of a police car may drive in any of a number of different modes including, for example, a regular cruising mode, an emergency mode (e.g., when responding to an emergency request for assistance), and a pursuit mode (e.g., when driving in pursuit of a suspect). As another non-limiting example, a driver of a fire truck may drive in a number of different modes including, for example, a regular cruising mode, an emergency mode (e.g., when responding to an emergency request for assistance), and a post-emergency mode (e.g., when driving away from a fire or other emergency situation).

As another non-limiting example, a driver of a semi-truck may drive in any of a number of different modes including, for example, a mode wherein a trailer or load is absent, and a mode wherein a trailer or load is present. For example, such a driver may be likely to desire greater headway and take curves more slowly when a trailer or load is present, than when a trailer or load is absent. As another non-limiting example, a driver of a tow truck may drive in a number of different modes including, for example, a mode wherein a towed vehicle is present, and a mode wherein a towed vehicle is absent. As another non-limiting example, a driver of a moving van or other delivery vehicle may drive in a number of different modes including, for example, a mode wherein cargo is present, and a mode wherein cargo is absent. As another non-limiting example, a driver of a taxi or bus such as a school bus may drive in a number of different modes including, for example, a mode wherein one or more passengers are present, and a mode wherein passengers are absent.

As another non-limiting example, a driver of a vehicle may drive differently at nighttime than in daytime. In such a situation, a daytime mode and a nighttime mode may be provided. For example, a driver may be likely to respond to driving events more slowly at nighttime than in daytime.

The foregoing examples of modes are presented for illustrative purposes and are not intended to be exhaustive. Indeed, other types of driving modes are within the scope of the present embodiment of the invention.

In accordance with some embodiments, the apparatus 300 may optionally identify new modes of driving. To identify the appropriate modes for a driver, the driving mode detector 309 or the sensor integration module 308 may determine when driver responses are not in line with the expected response for a given mode, and then identify the features of the driving context that appear to be associated with that deviation but that are not accounted for by that mode. The apparatus 300 learns which attributes of the driving context appear to be associated with changes in driver responses to potential driving hazards. It uses sensor information about the vehicle status and the driving environment to identify the appropriate driving mode (referred to as the "base" mode), the driving task (e.g., following another vehicle), and any potential hazards (e.g., a sudden deceleration of the lead vehicle). It also measures driver performance in avoiding that hazard (e.g., time to initiate a hazard avoidance response), and compares that performance to the expected performance for that mode.

If there is a significant departure from the expected performance, then a new temporary mode (referred to as the "candidate" mode) may be created, and the sensor data and performance measurements in that mode are stored. The apparatus 300 may also establish parameters that represent the strength of the association between the contextual features, as indicated by the sensor data, and the driver performance measurements, and initialize these parameters to small values. These parameters may be conditional probabilities or weights in a neural network model. They may indicate the likelihood that contextual variables such as time of day and road type, etc. are associated with the unexpected driving performance.

The candidate mode is temporary, if any data about the context and driver performance are based on only one event. Thus, for a certain number of driving events in the future, the timing and nature of any warnings to the driver continue to be controlled by the base mode, and the base mode continues to adapt to changes in driver performance in these situations.

In the future, however, when the driver is assumed to be in the base mode, and another event involving the same type of hazard occurs, the system again compares the driver's actual avoidance response to the expected response for the base mode. It then updates the probabilities or weights for the candidate mode that associate the contextual features with the response in that mode. If, for example, an unexpected response occurred during two similar events and both events occurred at night, then the unexpected response may become more strongly associated with driving at night. However, if the first event occurred in heavy traffic and the second occurred in light traffic, then this may weaken any association between the unexpected response and the traffic density.

The system may also modify the associative parameters in contexts that differ from the ones covered by the candidate mode. For example, in a case wherein the base mode comprises an emergency mode that expects a fast response from the driver, and the candidate mode comprises an emergency mode that predicts that the driver will respond more slowly at night, if the driver's response is faster for a relevant driving event that occurs during a daytime emergency response, then this strengthens the association between nighttime driving and slower response time in the candidate mode.

This contrast between different contexts highlights another property of the mode-discovery system—it may be more effective if the driver drives in a variety of contexts. For example, if the driver only drives during the day, then the system may eventually stop learning the association between the driver's behavior and the time of day. Thus, if the driver does not travel both during the day and at night, then the system may not build up a strong enough association between this contextual variable and behavior to allow it to determine whether time of day should be included in the new mode.

After data have been stored for the candidate mode from several events, a determination may be made as to whether there is sufficient evidence to retain and use that mode to control warnings, and an identification is made as to which attributes of the context will be associated with that mode. One approach is to establish that the value of at least one of the associative parameters (i.e., the probabilities or associative weights) has exceeded some magnitude for a minimum number of relevant events. Furthermore, if none of the associative parameters has achieved this magnitude after some minimum number of relevant events, then this is evidence that perhaps the unexpected response was anomalous or that there are other aspects of the driving context which account for that behavior but which are not measured by the sensors. In either case, the candidate mode may be discarded and the system continues to rely only on the base mode.

However, if the candidate mode is retained, it is stored along with the other permanent modes and used in all future relevant contexts to control the timing and nature of the warning in those contexts. Since this new mode elaborates on the base mode, then the base mode can control the timing and nature of warnings only when the context does not match all of the context definitions stored with the new mode. For example, if the base mode is an emergency mode that identifies an emergency according to whether the lights and siren are on, and if the new mode adds the requirement that the driver be traveling at night, then when a relevant driving event and hazard are detected in an emergency situation, the new mode will have priority over the base mode as long as the driver is traveling at night.

Referring again to FIG. 3, data from the sensor integration module 308 feeds into a threat assessment module 310. The threat assessment module 310 estimates the time to a hazard and the time available for the driver to avoid the hazard.

The storage module 312 may optionally store data about a driver's performance in different driving situations. For example, the storage module 312 may store data regarding response times and response patterns for event/status combination. As described above, the driver performance data helps to achieve an optimal presentation of customized warnings to a specific driver. The driver performance data may be updated over time.

The apparatus 300 may optionally comprise a driver identification module 314 which feeds into the storage module 312 and identifies a specific driver. The identification may be accomplished in any of a number of ways. As a non-limiting example, the driver may be identified by a fingerprint sensor or other biometric sensor. As another non-limiting example, the driver may be identified by a key fob associated with that driver. At least some of that driver's information may be stored in the key fob and synchronized with information stored in the storage module 312, in some embodiments.

A driver interface control module 316 determines whether to present a warning. If a warning is determined to be presented, the driver interface control module 316 sends control data and warning data to one or more warning devices 318. The driver interface control module 316 may determine the timing of the presentation of the warning. For example, the driver interface control module 316 may determine when to present a warning. The driver interface control module 316 may also determine the intensity of a warning. For example, the driver interface control module 316 may determine the rate of escalation of the intensity of the warning.

The driver interface control module 316 may further determine one or more modalities regarding how to present the warning. For example, the warning may be presented visually via a visual warning device 320, such as a situation awareness display. As another example, the warning may be presented audibly via an auditory warning device 322. For example, a verbal warning, beep, or other sound may be used to provide a warning to the driver. As another example, the warning may be presented via a haptic warning device 324. For example, a vibrating steering wheel, seat belt, or seat may be used to provide a warning to the driver. In addition, multiple modalities may be used to present a warning to the driver. The determination of modalities may be based upon the driver's data in the storage module 312. For example, the determination may be based upon which modality or combination of modalities is most likely to produce the most rapid and effective hazard avoidance response from the driver. As another example, the determination may be influenced by one or more driver preferences stored in the storage module 312 or the driver identification module 314.

One or more of the above-referenced components of apparatus 300 may comprise hardware, software, firmware, or a combination thereof. In some cases, data may be transmitted among the modules wirelessly. In some cases, data may be transmitted among the modules via a vehicle data bus. The components may also be coupled to a central processor unit via the bus.

Figure 4:
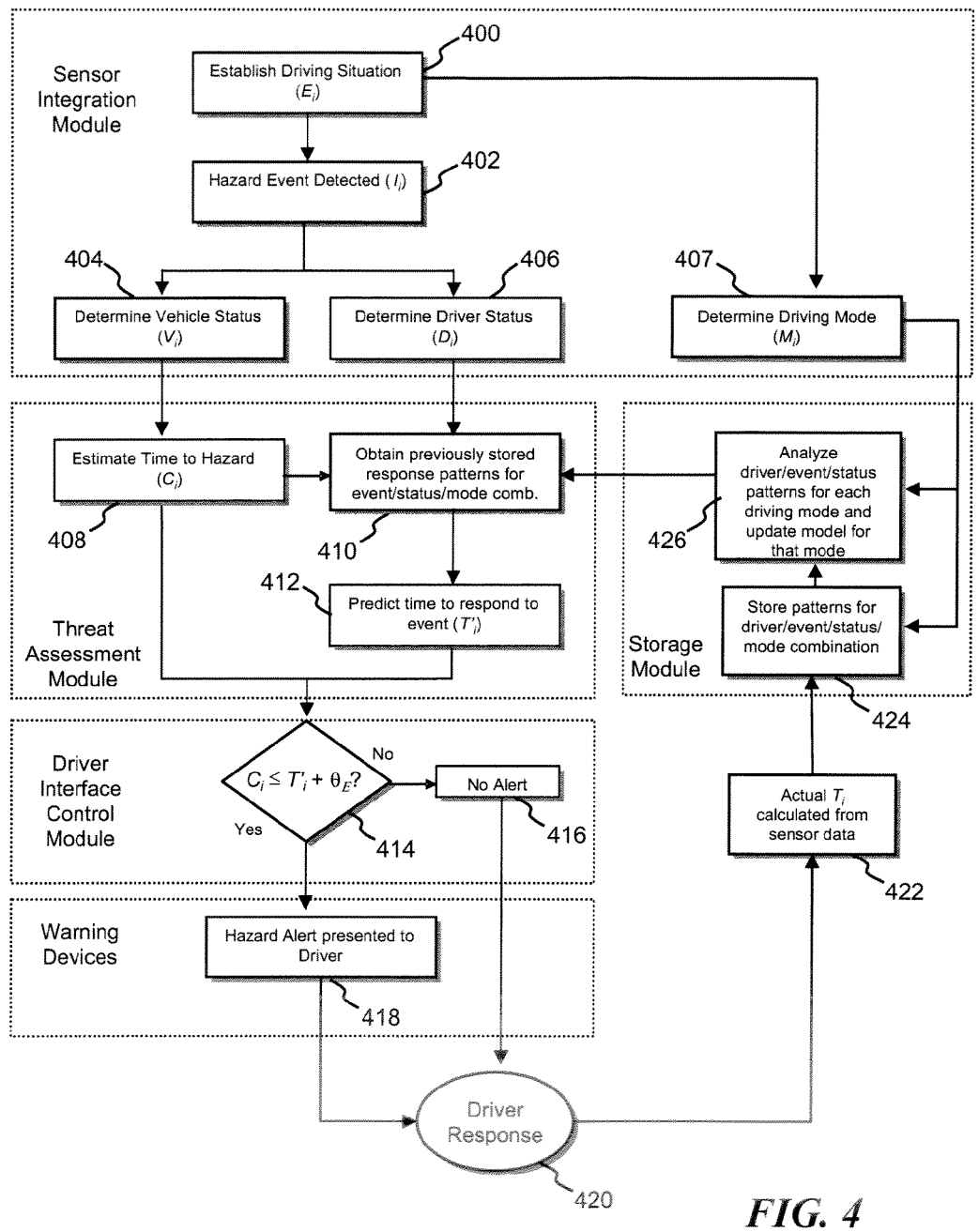
FIG. 4 depicts an exemplary process flow diagram for providing user-adaptive and mode-sensitive warnings in accordance with another embodiment of the present invention.

Reference is now made to FIG. 4, which depicts a process flow diagram for providing a user-adaptive and mode-sensitive warning in conjunction with the apparatus 300 of FIG. 3. In step 400, a driving situation $E_i$ is established by the sensor integration module 308. Illustrative examples of a driving situation include without limitation following another vehicle, negotiating a curve in the road, overtaking another vehicle, or any other situation that may produce a potential hazard.

In step 402, a hazard event $I_i$ is detected. For example, in the case of a vehicle following too closely, the hazard event may comprise deceleration of the lead vehicle. Additional types of hazard events may be determined, utilizing information from the external condition sensors 302 and/or sensor integration module 308.

In step 404, a vehicle status $V_i$ is determined. For example, the activation of a siren or other emergency indicator may be determined. As another example, the weight of a trailer may be determined. Additional vehicle statuses may be determined, utilizing information from the vehicle condition sensors 304 and/or sensor integration module 308.

In step 406, a driver status $D_i$ is determined. For example, the driver's eye gaze and foot position may be determined, as well as the position of the driver's hands on or off the steering wheel. The driver's use of a wireless communication device or other equipment may also be determined. Additional driver statuses may be determined, utilizing information from the driver condition sensors 306 and/or sensor integration module 308.

In step 407, a driving mode, $M_i$, is determined based on data from external and vehicle sensors. This mode is based on information such as whether the emergency lights and siren have been activated in an emergency vehicle. It may be based on weight sensors in the cab of a truck indicating that the truck has a load in the cab. It may be based on other vehicle or external sensor data.

The threat assessment module 310 estimates the time to hazard $C_i$ in step 408. The previously stored driver response times and patterns are obtained from the storage module 312 in step 410. A predicted time to respond to the event $T_i'$ is determined in step 412 based on, inter alia, the above statuses and the specific driver's past performance.

The driver interface control module 316 compares the time to hazard $C_i$ to the predicted response time $T_i'$ in decision 414. If $C_i > T_i' + \theta_E$, no hazard alert is presented in step 416. In addition, a driver who is driving in an emergency mode, for example, may not require certain warnings (such as warnings regarding lane departure, road curve, and red light, to name a few), and therefore nuisance alarms may be avoided.

If $C_i \leq T_i' + \theta_E$, then a hazard alert is presented to the driver in step 418 via one or more of the warning devices 318. The timing and modality of the warnings may be selected based on the particular mode of driving. Values of parameters of warning algorithms are adjusted based on the mode of driving. This reduces the problem of nuisance alarms (which occur after the driver has perceived the hazard and may have already initiated an avoidance response). In some embodiments, the timing and modality of the warnings may also be selected based on what is determined to be most effective for the particular driver.

In step 420, the driver responds to the alert or event. The driver's actual response time $T_i$ is determined in step 422. The driver's actual response time $T_i$ may be stored in the storage module 312. The storage module 312 stores patterns for driver, event, status, and mode combinations in step 424. Patterns of driver, event, and status for each driving mode are analyzed and the model for that mode is updated in step 426.

In accordance with various embodiments, a process for identifying new modes may be optionally provided. Given a certain context, a driver response to a hazard in that context is recorded as follows. The driving mode is identified by processing sensor data, retrieving a driving mode $M_A$, and retrieving a candidate mode $M_B$ with corresponding weights representing the strength of association between the context and the anomalous driving behavior. A potential hazard event is detected. The parameters for $M_A$ are used to control and possibly provide a warning. The actual response time $T_i$ is recorded.

The actual response time $T_i$ is compared to the expected response times $T_A$ and $T_B$ for the modes $M_A$ and $M_B$, respectively, as follows. With respect to mode $M_A$, a statistical test of the difference between $T_i$ and $T_A$ is performed. With respect to mode $M_B$, if there are enough response times stored for $M_B$, a predicted $T_B$ is computed, and if needed, some measure of variability for $M_B$ is computed. The predicted response time may be, for example, the mean response times for $M_B$. The measure of variability may be, for example, the variance which would be used if a parametric statistical test is used. A statistical test of the difference between $T_i$ and $T_B$ is performed.

Next, the candidate mode $M_B$ is updated as follows. The actual response time $T_i$ is recorded. Sensor indicators $a_{ij}$ are activated for each attribute j of this context. For example, $a_{i1}$ may be set to equal 1 if driving in a suburban area, or ail may be set to equal −1 if driving in an urban area; $a_{i2}$ may be set to equal 1 if driving in low-density traffic, or $a_{i2}$ may be set to equal −1 if driving in high-density traffic; and $a_{i3}$ may be set to equal 1 if driving at nighttime, or $a_{i1}$ may be set to equal −1 if driving during daytime. The foregoing examples are provided as illustrative examples and are not intended to be exhaustive. In an alternative implementation, some of the sensor indicator variables (e.g., $a_4$) may likely be continuous rather than binary, reflecting the continuous nature of the events being detected (for example, it may be dusk or dawn, which is part-way between day and night).

The weights may then be modified accordingly. For example, the weights may be modified in accordance with a learning algorithm for a neural network as follows:

$$w_{Bj} = w_{Bj} + \beta^*(a_{ij} - \bar{a}_{i-1,j})^*(O_i - P_i),$$

$$0 \leq \beta \leq 1,$$

for all j, $1 \leq j \leq 3$, wherein $\bar{a}_{i-1,j} = \bar{a}_{i-2,j} + \gamma^*(a_{i-1,j} - \bar{a}_{i-2,j})$, so that $\bar{a}_{i-1,j}$ represents a weighted average value for attribute j during the previous i−1 events, and $\bar{a}_{0,j} = 0$, $$0 \leq \gamma \leq 1,$$

$$P_i = \sum_k (a_{ik} - \bar{a}_{i-1,k}) w_{Bk},$$

so that $P_i$ represents the strength of the system's prediction that $T_i > T_A$ and $T_i \approx T_B$, and $O_i = 1$ if $T_i > T_A$ and $T_i \approx T_B$, and $O_i = -1$ if $T_i \leq T_A$ and $T_i < T_B$, so that $O_i$ represents the observed driver response.

As an example, if the driver only drives in suburban areas (i.e., $a_{i,1} = 1$ for all previous i−1 events, so that $\bar{a}_{i-1,1}$ becomes 1), then after some number of events, $a_{i1} - \bar{a}_{i-1,1}$ becomes 0, and the weight for this attribute is no longer modified. The system eventually stops learning about the association between the driver's behavior and a particular attribute of the context if that attribute does not change.

In accordance with various embodiments, a decision may be made regarding whether to store the new mode $M_B$ in a storage location, such as storage module 312 or module 311, based on whether a consistent relationship exists between the anomalous driver behavior and at least one attribute of the context. For example, if the absolute value of any of the weights (i.e., $|w_{Bj}|$) exceeds some value α ($0 \leq \alpha \leq 1$) over a series of X events ($X \geq 0$), then a decision may be made to store the mode $M_B$. The mode $M_B$ may be stored as a variant of $M_A$, and may be characterized by such parameters as the pattern of sensor data that defines the context for the base mode $M_A$ (for example, driving with emergency lights and siren activated), the pattern of sensor data that defines the additional attributes for mode $M_B$ (i.e., all of the attributes for which $|w_{Bj}| > \alpha$; for example, driving at night), and one or more summary statistics for driver performance under $M_B$ (for example, a minimum response time $R_B$ that the driver exhibits when following another vehicle that suddenly decelerates). For the contextual variables for which $|w_{Bj}| > \alpha$, the valence of their corresponding weights may determine which alternative attribute for that variable is stored with this mode. For example, consider attribute 1, which corresponds to driving in a suburban or urban area. If $|w_{B1}| > \alpha$ and $w_{B1} < 0$, then mode $M_B$ would include driving in an urban area, since the weight indicates that the driver exhibits the slower response when driving in urban areas.

A decision to delete $M_B$ may be made if there appears to be no relationships between the unusual response time and any attributes of the context. For example, if, after Y events ($Y \geq 0$), $|w_{Bj}| \leq \alpha$ for all of the weights, then $M_B$ may be eliminated.

The following example is provided to illustrate the optional process for mode determination. In an event $x_1$, a driver response to a hazard in a certain context is recorded as follows. An appropriate mode is identified by processing sensor data and retrieving a corresponding mode. In this example, the vehicle status indicates that an emergency indicator such as a siren and lights are on. The driving situation is established and includes a situation of following a lead vehicle in a suburban area at nighttime in low-density traffic. The driver status is determined and eye gaze data indicates that the driver is likely paying attention to the lead vehicle. Given the aforementioned sensor data, a template corresponding to the data is retrieved. A driving mode is determined and identified as an emergency mode $M_A$ based on the activation of emergency siren and lights. The expected driving behavior for this mode $M_A$ includes faster response times to unexpected hazards.

In the present example, a hazard $I_1$ is detected, comprising a sudden deceleration by the lead vehicle. Next, a decision is made regarding whether to provide a warning to the driver. An expected driver response time $T_A'$, under mode $M_A$, is used to determine the timing and nature of a warning which may potentially be provided to the driver. The driver's actual response time $T_1$ to the hazard event $I_1$ is recorded. In this example, $T_1$ comprises the driver's response time to the lead-vehicle deceleration.

A comparison between $T_1$ and $T_A'$ is made for mode $M_A$. Any of a number of statistical tests may be used for this comparison. In the present example, the result of the comparison shows a significant difference between the two values, with $T_1 > T_A'$. Given the significant difference, a new candidate mode $M_B$ that is a variant of the mode $M_A$ is stored. The mode $M_B$ includes the following parameters: one or more driver behavioral measures, e.g., $T_1$ for event $x_1$; sensor data for event $x_1$; a representation of the strength of association (e.g., weights or probabilities) between the context (as represented by the sensor data) and the anomalous driving behavior. For example, the weights for mode MB may include the following parameters: $w_{B1}$=Location (Suburban vs. Urban area) weight; $w_{B2}$=Traffic (Low vs. High density) weight; and $w_{B3}$=Time (Night vs Day) weight. The weights may be initialized to a small value. As a variant of the mode $M_A$, candidate mode $M_B$ in this example is active when the vehicle status sensors indicate that the lights and siren are on.

In an extension of the present example, in a subsequent event $x_2$, in which $T_2 > T_A'$, a driver response to a hazard in a certain context is recorded. The sensor data is processed and is determined to be the same as in $x_1$, except that the time is daytime. The appropriate mode, $M_A$, is retrieved. The candidate mode $M_B$ and corresponding weights are also retrieved. In this example, a hazard $I_2$ comprising a sudden deceleration by a lead vehicle is detected. The parameters associated with mode $M_A$ are used to control and possibly provide a warning. The actual response time $T_2$ is recorded.

The actual response time $T_2$ is compared to the expected response time for mode $M_A$. In this example, the comparison indicates a significant difference between the observed response time and the response time predicted under mode $M_A$, with $T_2 > T_A'$.

The candidate mode $M_B$ is updated. The actual response time $T_2$ is stored. The weights may be modified. As an example, $w_{B1}$ and $w_{B2}$ may be increased (since in both $x_1$ and $x_2$, the location and traffic conditions were comparable), and $w_{B3}$ may be decremented (since event $x_1$ occurred during nighttime, and $x_2$ occurred during daytime). The weights may not be modified in some cases, for example, if the driver status indicates the weights should not be modified. As an example, the driver's eye gaze, rather than the vehicle status or the status of the external environment, may account for a slower response time.

When the candidate mode $M_B$ is stored, then at least one attribute of context stored may include data indicating that the emergency siren and light are on. If $w_{B3} > 0$, then the alternative attribute stored with $M_B$ includes driving at night; if $w_{B3} < 0$, then the alternative attribute stored with $M_B$ includes driving during the day.

If the attributes stored with mode $M_B$ include driving at night and driving in a suburban area, mode $M_B$ may be used to control the timing and nature of a warning when the driver has turned on the emergency siren and lights, the vehicle is being driven in a suburban area, and the driver is traveling at night. If the lights and siren are on, but the vehicle is being driving in an urban area, then mode $M_A$ may be used to control the timing and nature of the warning. If $M_B$ is active, then a slower driver response may be predicted than if $M_A$ is active. Thus, when the driver has turned on the emergency siren and lights, an earlier warning will more likely be provided when a lead vehicle suddenly decelerates as long as the driver is driving in a suburban area at night. However, the warning will more likely be delayed in an emergency response situation when the driver is driving in an urban area or during the day. In this latter situation, the system predicts that the driver will respond more quickly to the unexpected hazard.

Accordingly, embodiments of the present invention may detect a driver's mode of driving, store information about driving style for each of the different modes, and use this stored information to adjust the timing and nature of warnings for the different modes. By adjusting warnings according to context, warnings can be optimized according to the needs of the driver in different driving situations. In addition, imprecise alarms and nuisance alarms may be avoided. Furthermore, the improved warning systems and methods may decrease the number of vehicular collisions, thereby improving safety.

It should be understood that the inventive concepts disclosed herein are capable of many modifications. To the extent such modifications fall within the scope of the appended claims and their equivalents, they are intended to be covered by this patent.

The invention claimed is:

1. A method of controlling presentation of vehicle hazard warnings to a driver of a vehicle by an in-vehicle warning apparatus, the method performed by the in-vehicle warning apparatus comprising the steps of:
   identifying the driver of the vehicle;
   detecting a driving situation based upon information from one or more sensors;
   detecting a potential driving hazard;

predicting a response time for the identified driver to avoid the hazard in the driving situation based upon stored information regarding past performances of the identified driver in one or more similar driving situations;

determining an estimated time to the hazard;

comparing the predicted response time to the estimated time to the hazard; determining whether to provide a warning to the identified driver, based upon the act of comparing; and if the act of comparing indicates that the warning should be provided, determining one or more modalities of presentation of the warning.

2. The method of claim 1, wherein the driving situation comprises following a lead vehicle.

3. The method of claim 2, wherein the driving hazard comprises deceleration of the lead vehicle.

4. The method of claim 1, further comprising the steps of:
measuring an actual response time for the identified driver; and
updating the stored information regarding the past performances of the identified driver, based upon the actual response time for the identified driver.

5. The method of claim 1, wherein the one or more modalities of presentation comprises visual presentation.

6. The method of claim 1, wherein the one or more modalities of presentation comprises auditory presentation.

7. The method of claim 1, wherein the one or more modalities of presentation comprises haptic presentation.

8. The method of claim 1, further comprising the step of determining a starting time for the warning based upon the identity of the driver and the stored information regarding past performances of the identified driver.

9. The method of claim 1, further comprising the step of determining an intensity for the warning based upon the identity of the driver and the stored information regarding past performances of the identified driver.

* * * * *

UNITED STATES PATENT AND TRADEMARK OFFICE
CERTIFICATE OF CORRECTION

| | | |
|---|---|---|
| PATENT NO. | : 7,609,150 B2 | Page 1 of 1 |
| APPLICATION NO. | : 11/465549 | |
| DATED | : October 27, 2009 | |
| INVENTOR(S) | : Wheatley et al. | |

It is certified that error appears in the above-identified patent and that said Letters Patent is hereby corrected as shown below:

IN THE SPECIFICATION

In Column 6, Line 39, delete "$D_{il}$" and insert -- $D_{iL}$ --, therefor.

In Column 7, Line 9, after "$\gamma D_{i+1,L+1}$" insert -- . --.

In Column 15, Line 53, delete "MB" and insert -- $M_B$ --, therefor.

Signed and Sealed this
Fourth Day of October, 2011

David J. Kappos
*Director of the United States Patent and Trademark Office*